United States Patent
Kamenz et al.

(10) Patent No.: US 8,751,543 B2
(45) Date of Patent: Jun. 10, 2014

(54) DATABASE VIEW MODELING USING EXISTING DATA MODEL

(75) Inventors: Torsten Kamenz, Wiesloch (DE); Andreas Kemmler, Bonnigheim (DE)

(73) Assignee: SAP AG, Walldorf (DE)

(*) Notice: Subject to any disclaimer, the term of this patent is extended or adjusted under 35 U.S.C. 154(b) by 18 days.

(21) Appl. No.: 13/548,759

(22) Filed: Jul. 13, 2012

(65) Prior Publication Data
US 2014/0019473 A1 Jan. 16, 2014

(51) Int. Cl.
*G06F 17/30* (2006.01)

(52) U.S. Cl.
USPC .......... 707/803; 707/804; 707/790; 707/808; 707/809; 707/811; 707/810

(58) Field of Classification Search
CPC ............... G06F 17/30011; G06F 17/30286; G06F 17/30023
USPC .......... 707/790, 803–804, 808–11, 808–811; 705/348; 709/201, 203, 213, 217
See application file for complete search history.

(56) References Cited

U.S. PATENT DOCUMENTS

| | | | |
|---|---|---|---|
| 2010/0042241 A1* | 2/2010 | Inoue | 700/97 |
| 2011/0270870 A1* | 11/2011 | Dettinger et al. | 707/769 |
| 2012/0078590 A1* | 3/2012 | Hao et al. | 703/1 |
| 2012/0110021 A1* | 5/2012 | Hryniewicki | 707/790 |
| 2012/0221598 A1* | 8/2012 | Dettinger et al. | 707/769 |
| 2012/0239613 A1* | 9/2012 | Danciu et al. | 707/603 |
| 2012/0278275 A1* | 11/2012 | Danciu et al. | 706/59 |
| 2012/0290940 A1* | 11/2012 | Quine | 715/744 |
| 2013/0060728 A1* | 3/2013 | Beraudier et al. | 706/50 |
| 2013/0085962 A1* | 4/2013 | Duncanson et al. | 705/348 |
| 2013/0091486 A1* | 4/2013 | Gemmell et al. | 717/104 |

* cited by examiner

*Primary Examiner* — Frantz Coby
(74) *Attorney, Agent, or Firm* — Fountainhead Law Group PC

(57) ABSTRACT

A data model may be designed based views of a pre-existing data model. Metadata associated with the pre-existing data model may be presented to the user to support the user's design effort. The metadata may inform and otherwise guide the user's design choices to reduce the likelihood of inconsistencies between the new data model and the pre-existing data model. The metadata may also be used to identify and warn the user of potential inconsistencies between the new data model and the pre-existing data model.

20 Claims, 5 Drawing Sheets

DATABASE VIEW MODELING USING EXISTING DATA MODEL

BACKGROUND

Unless otherwise indicated herein, the approaches described in this section are not prior art to the claims in this application and are not admitted to be prior art by inclusion in this section.

Existing enterprise business applications such as SAP® Enterprise Resource Planning (ERP) are typically based on a data model which was designed, implemented, evolved over a long period of time; a period a few years is not uncommon. The data model is typically implemented in a proprietary way and can only be accessed and consumed via a suitable application server (e.g., SAP® ABAP application server). Data models are crucial for the running business applications, and thus must be carefully maintained in order to guarantee stability of the enterprise's existing business processes.

With the introduction of in-memory database systems (e.g., the SAP HANA® database product), direct access to the business data and the implementation of application logic in the database layer becomes possible. Business data can be accessed using standard means like sequential query language (SQL) or multi-dimensional expressions (MDX), especially for analytical purposes. In order to make the data available, a new data model layer needs to be created on top of the pre-existing data model so that desired analytics can be performed on the underlying business data.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
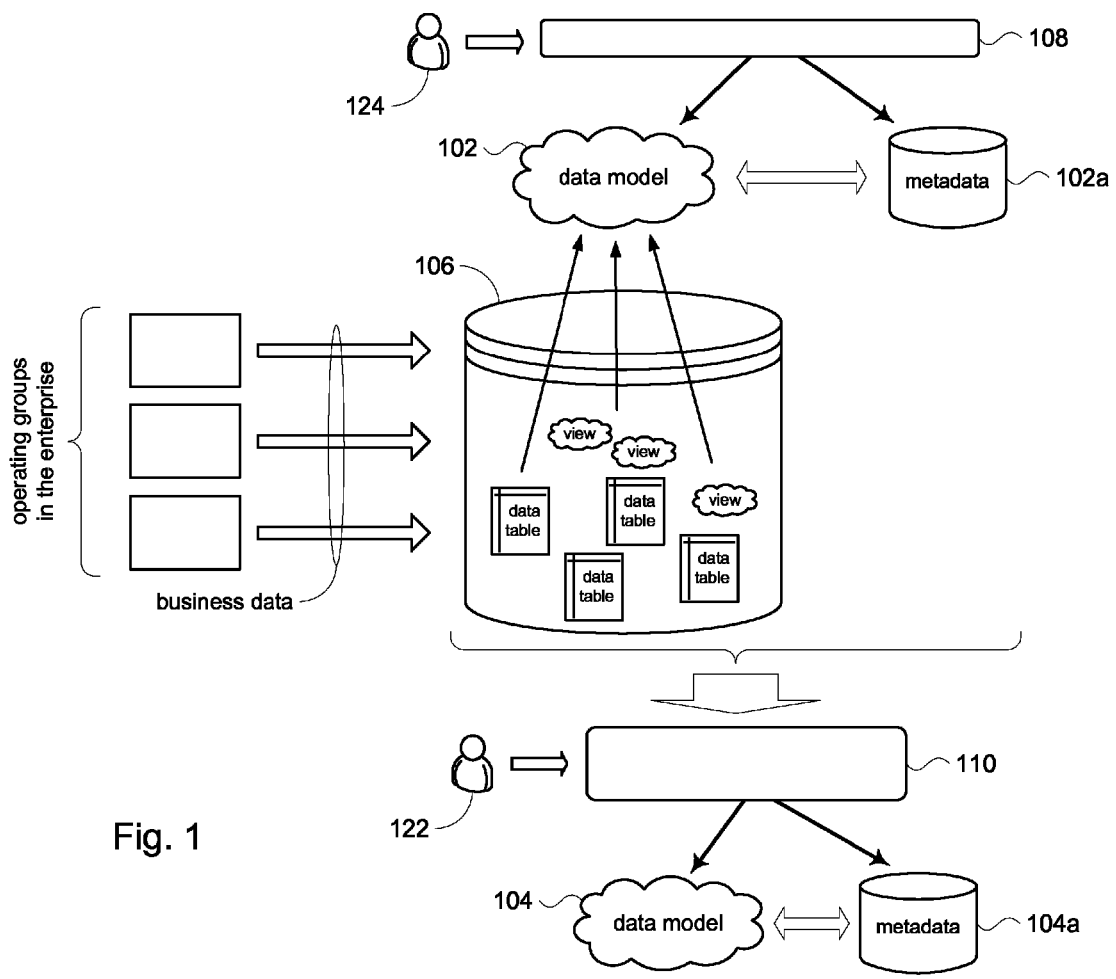
FIG. 1 illustrates a high level overview of an embodiment according to principles of the present disclosure.
Figure 1A:
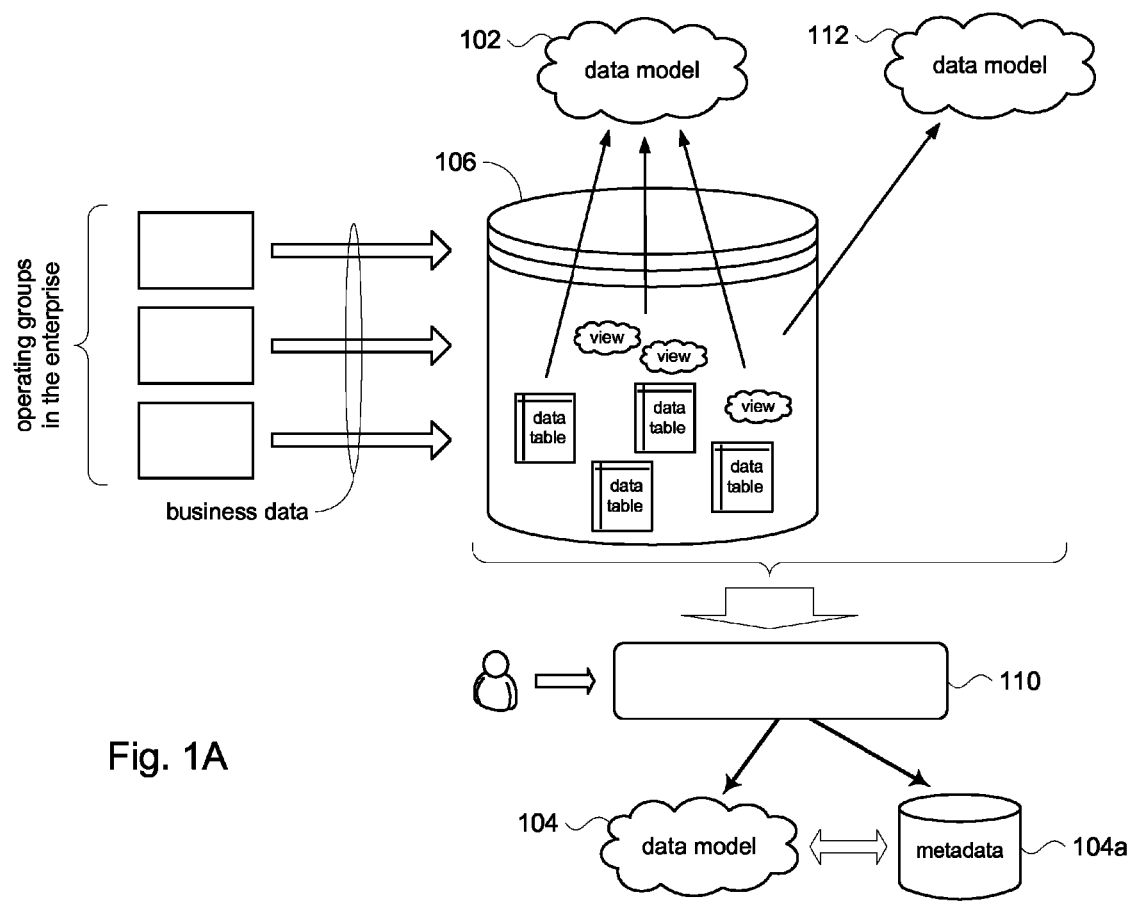
FIG. 1a illustrates data modeling using two or more pre-existing data models.

Referring to FIG. 1, data modeling in accordance with embodiments of the present disclosure includes using information comprising a pre-existing data model 102 to develop a new data model 104. The new data model 104 can then be used, for example to perform analytics, without the risk of disrupting ongoing business activity with the pre-existing data model 102 or otherwise corrupting the pre-exiting data model. Referring for a moment to FIG. 1A, the figure illustrates that in some instances two or more pre-existing data models 102 and 112 may be used to develop a new data model 104.

FIG. 1 shows a database system ("database") 106 that collects business data generated by various operating groups in an enterprise. Business data may also be referred to as transactional data or application data. Business data may include any kind of data that is produced during the course of business activities that take place in the enterprise. Business data may include, for example, sales data generated by the various sales groups in the enterprise, production figures from manufacturing groups, consumption rates and purchase orders of raw materials used for manufacturing, travel expenses, marketing and advertising costs, customer interactions, and so on. The business data may be stored in various data tables in the database 106.

The enterprise may employ one or more business applications 108 to process the business data that is collected and stored in the database 106, including developing one or more data models 102 to manage the business data. The enterprise may employ several business applications, for example, enterprise resource planning (ERP), customer relationship management (CRM), supply chain management (SCM), supplier relationship management (SRM), and so on. One or more data models may be defined for the business area that is covered by a given business application.

A data model 102 comprises the business data that is being modeled. The data model 102 references the business data in terms of one or more of the data tables of the database 106 in which the business data are stored. The data model 102 may further comprise one or more views of the data tables. In the case of a relational database, views may be generated by applying database operations (e.g., SQL operations such as SELECT, JOIN, SUM, etc.) on various data tables to access the business data that is relevant for the data model 102.

The data model 102 may further comprise metadata 102a which describe the business data and how the business data is stored. In some embodiments, the metadata 102a may be stored in a metadata repository. For example, the metadata repository may comprise data tables in a data dictionary. In other embodiments, the metadata 102a may be stored as a set of tables in the database 106.

Metadata 102a identifies the business data that the data model 102 uses, specifies characteristics of the business data, and describes how the business data are stored. For example, the metadata 102a may identify the data tables that the data model 102 references, the individual table fields of the data tables that constitute the data model, the view definitions for generating views that comprise the data model, and so on. The metadata 102a may specify how the data tables and the table fields relate to each other (e.g., primary key/foreign key relationships) in the data model 102. The metadata 102a may specify constraints on the business data that comprise the data model 102; e.g., data types (text, integers, date values, etc.), maximum values, valid data ranges, valid values, maximum number of characters, and so on. The metadata 102a may include supplemental information relating to the business data. Supplementary information may include, for example, labels and other textual information that may be displayed on a user interface or in a report when presenting views of the data model.

In accordance with principles of the present disclosure, a data model design tool 110 may employ the data tables, views, and metadata that comprise the pre-existing data model 102 to support the development of a new data model 104. The new data model 104 may include associated metadata 104a which define and characterize the business data that constitute the new data model.

In some embodiments, the components may be instantiated across several servers. For example, the database 106 and may be provided on a database server system and business application 108 (including metadata 102a) may be provided on a separate application server. The application server (e.g., an ERP server running an ERP business application) may communicate with the database server via a suitable communication network (e.g., local area network, LAN or wide area network, WAN). The data model design tool 110 (including data model 104 and metadata 104a) may be provided on yet another server that communicates with the database server and business application server over suitable communication networks.

In other embodiments, the database 106 may be an in-memory database product that serves as the primary database for the business application 108 (e.g., ERP, CRM, etc.). An example of an in-memory database is the SAP HANA® database product. The data model design tool 110 may be a database integration tool that runs on the in-memory database product.

Figure 2:
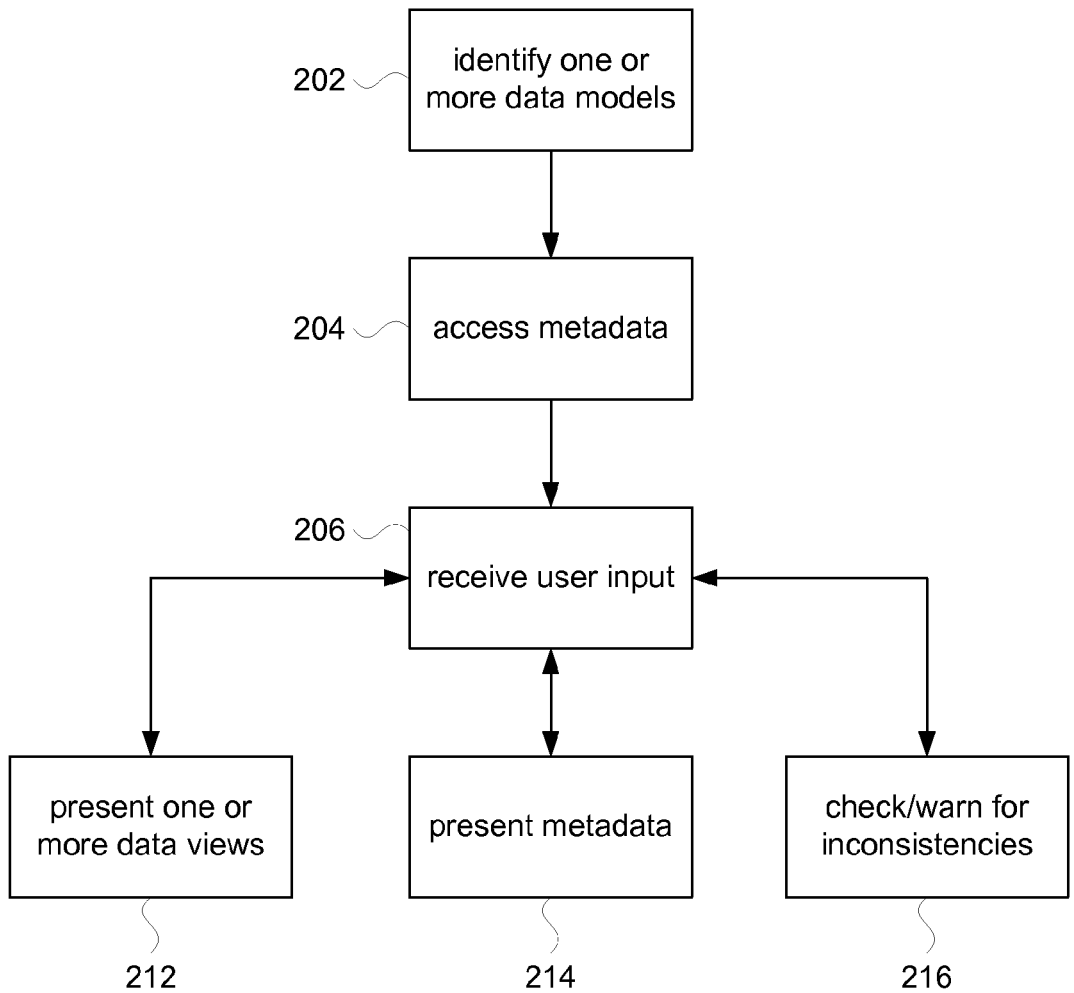
FIG. 2 shows a process flow in accordance with the present disclosure.

FIG. 2 shows a process flow for defining a data model in accordance with the present disclosure. In embodiments, the process flow may be managed by the data model design tool 110. Thus, for example, in a process block 202, the data model design tool 110 may receive from a user 122 an identification of one or more pre-existing data models as a starting point. In process block 204, the data model design tool 110 may access the metadata for each pre-existing data model specified by the user. For example, the metadata may be stored in data dictionary tables associated with the pre-existing data model.

The data model design tool 110 may continue interacting with the user 122 to define the new data model. The discussion will assume that the user has identified one pre-existing data model, but it will be understood that the processing can be readily adapted to include two or more pre-existing data models. Accordingly, in a process block 212, the user 122 may call up one or more views of the data model. As explained above, a "view" (also referred to as "stored query") is generally obtained by performing database operations such as queries (e.g., SELECT), aggregations (e.g., SUM), joins (e.g., JOIN), etc. on the data tables that are referenced by the pre-existing data model. In accordance with the present disclosure, the user 122 may call up one or more pre-existing views. The user may define new views by performing database operations on the data tables of the data model or by performing database operations on pre-existing views.

In a process block 214, at least some of the metadata associated with the pre-existing data model may be presented to the user. For example, the metadata may be used to identify the data tables referenced by the pre-existing data model so that the user 122 may define their own views. Metadata pertaining to relationships among the data tables of the pre-existing data model may be presented to the user. For example, a foreign key appearing in one data table may be used to identify the related data table by mapping the foreign key from the one data table to the primary key in the related data table. Metadata that describes the table fields may be presented to the user; e.g., their data types, permitted values, range of valid values, and so on. Of course, other relevant metadata may be presented as well.

The metadata may be presented to the user in separate windows in the graphical user interface (GUI) of the data model design tool 110. For example, the relationships among the data tables of the pre-existing data model may be depicted in their own windows in the GUI. Metadata relating to the characteristics of a table field may be more appropriately presented in a pop-up window. For instance, a list of potentially useful data values or allowed data values for a given table field may be presented in a pop-up window, allowing the user 122 to select a value from the list.

The metadata may be presented in response to the user's actions. For example, when the user 122 adds a new table field into a data table or modifies an existing table field, the data model design tool 110 may display relevant information from the metadata relating to the data table. As another example, suppose the user 122 creates a view from data tables of the pre-existing data model. The data model design tool 110 can determine if the two data tables have a primary key/foreign key relationship, and if so may suggest performing a JOIN of the two data tables.

The user 122 may explicitly request certain metadata to be displayed on the GUI. In some embodiments, for example, a metadata window on the GUI may be provided that displays all the metadata associated with the pre-existing data model. As an alternative to displaying all the metadata all at once, a more practical approach may be to provide the metadata based on context. For example, the user 122 may hover their mouse cursor over a heading of a table field of a data table to display the metadata relating to the table field, such as data type, valid values or range of values, and so on.

The new data model may be defined using the data tables of the pre-existing data model, views of the data tables, views of views, and metadata associated with the pre-existing data model. The user 122 may specify table joins, add new table fields, delete existing table fields, redefine characteristics of existing table fields, and so on. Integrating the presentation of metadata that is associated with the pre-existing data model, in accordance with principles of the present disclosure, may guide the user 122 in their data modeling efforts. The user 122 can conveniently refer to the metadata during their design effort, thus reducing the amount of guesswork the user has to make, and in turn reducing the likelihood of introducing inconsistencies or errors in the new data model and other artifacts that may create inconsistent behaviour between the pre-existing data model and the new data model.

When the user 122 has completed their session with the data model design tool 110 (e.g., the user initiates a SAVE operation to save the new data model), the data model design tool, in process block 216, may employ the metadata associated with the pre-existing data model to check for potential inconsistencies that may have been introduced during the user's session with the data model design tool. For example, suppose the user 122 added a new table field to the new data model, the data model design tool 110 may use the metadata associated with the pre-existing data model to verify that the new table field is consistent with the pre-existing data model.

The data model design tool 110, in process block 216, may inform the user 122 if a potential inconsistency or error is detected in the new data model. In some embodiments, the data model design tool 110 may issue a warning and allow the user 122 to decide whether or not to make changes to the new data model. In some embodiments, the data model design tool 110 may disallow certain actions. For example, suppose the pre-existing data model includes confidential customer information. If the user 122 attempts to incorporate the confidential customer information into the new data model, the metadata associated with the pre-existing data model may identify the confidential customer information as "read-only" and not allow the information to be incorporated into the new data model.

It can be appreciated that the process of creating a new data model is an iterative process. Accordingly, the process blocks 206, 212, 214, and 216 may be repeated. For instance, the user may specify several different views of the pre-existing data model. For each view, the data model design tool 110 may have to access the metadata relevant to those views, and may present them to the user 122. Inconsistency checks and warnings may be made as the user 122 defines new table fields or redefines existing table fields, and so on.

As explained above, in some instances, a new data model may be derived from two or more pre-existing data models. In accordance with the present embodiments, the data model design tool 110 may access the metadata associated with each pre-existing data model and process the metadata in accordance with the process flow shown in FIG. 2.

Referring again, for a moment, to FIG. 1, the new data model 104 includes metadata 104a which describes the business data (e.g., views and data tables) that comprise the new data model and how that business data is stored. Since the new data model 104 is based largely on the same business data that comprises the pre-existing data model 102, metadata 104a will comprise some of metadata 102a. However, the way the metadata 104a is stored may differ from the way metadata 102a is stored. For example metadata 102a may be stored in a proprietary data dictionary, while metadata 104a may be stored in a common format. Generally, where and how metadata 104a is stored is independent of where and how metadata 102a is stored.

Figure 3:
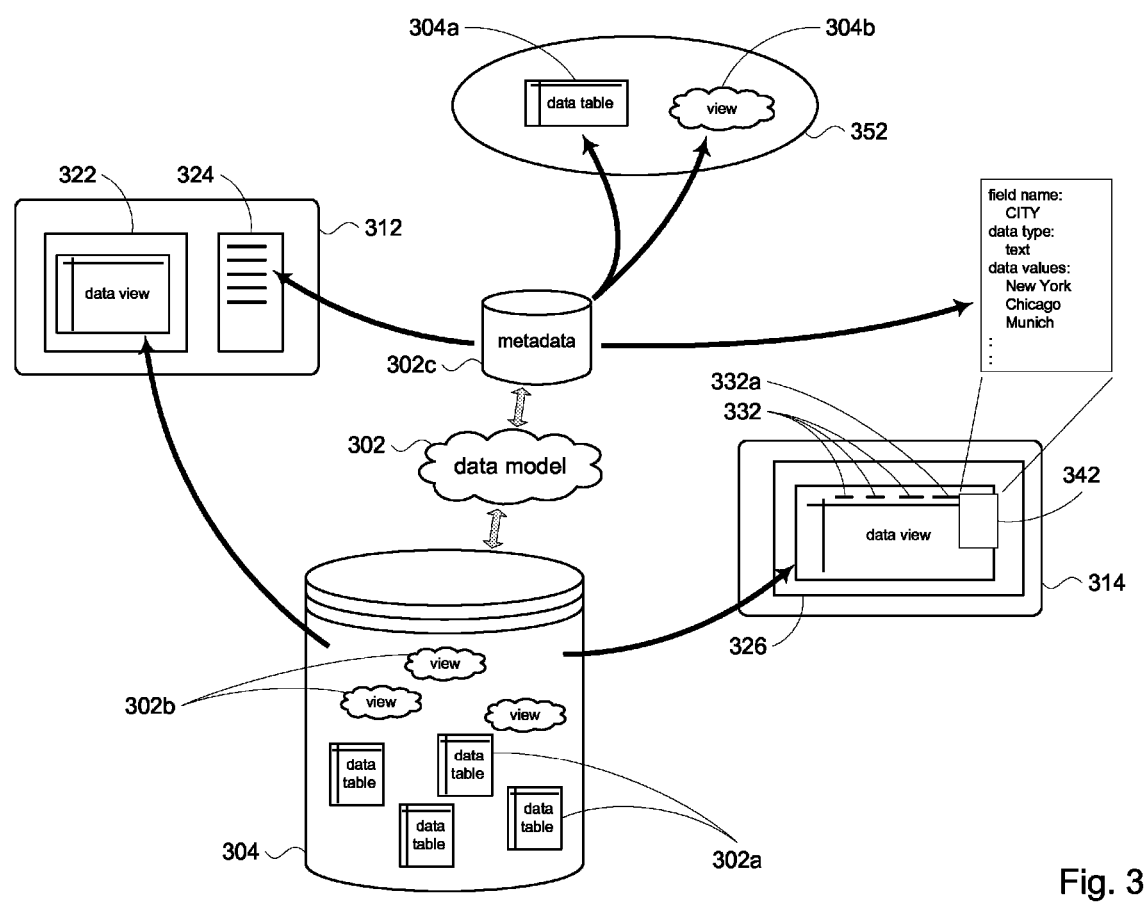
FIG. 3 illustrates some data flows in accordance with the present disclosure.

FIG. 3 illustrates some examples of metadata flows in accordance with the present disclosure. The figure shows a pre-existing data model 302 comprising data tables 302a, views 302b, and associated metadata 302c. The data tables 302a may be stored in a database 304. The views 302b may exist as stored queries in the database 304. The metadata 302c may be stored in database 304 or in a separate data store (e.g., a data dictionary). The figure shows two examples of GUI instances 312 and 314 of the data modeling design tool 110.

The GUI instance 312 includes two windows 322 and 324. The window 322 represents a display of a view of the data model 302. Although not illustrated in the figure, the GUI 312 may include an input area that allows the user 122 to call up, in window 322, a pre-existing view 302b of the data tables 302a, or to specify a new view (e.g., using SQL statements) of the data tables or other views. The window 324 may display all of the metadata 302c associated with the data model 302. The user 122 may scroll through the window 324 to review the metadata 302c. Since a data model may contain a very large amount of metadata, presenting all the metadata 302c to the user 122 all at once in window 324, as in GUI instance 312, may not be an efficient way to present metadata to the user.

In some embodiments, the metadata 302c may be presented to the user 122 in a context sensitive manner. The GUI instance 314 shows a window 326 which displays another view of the data model 302. Table fields 332 of the view are also illustrated in this GUI instance. When the user 122 hovers their mouse cursor over a table field, the data model design tool 110 may access only those portions of the metadata 302c that are relevant to the table field. As illustrated in GUI instance 314, for example, a pop-up window 342 of relevant metadata may appear in the window 326 when the user 122 hovers their mouse cursor over table field 332a.

FIG. 3 shows processing activity 352 performed by the data model design tool 110, for example, to ensure consistency of data tables 304a and views 304b that comprise the new data model in accordance with processing block 216. The processing activity 352 may include the data model design tool 110 accessing the metadata 302c associated with the pre-existing data model to check for potential inconsistencies between the data tables 304a and views 304b of the new data model and the data tables 302a and views 302b of the pre-existing data model 302. Identified inconsistencies may then be presented for handling by the user 122.

Figure 4:
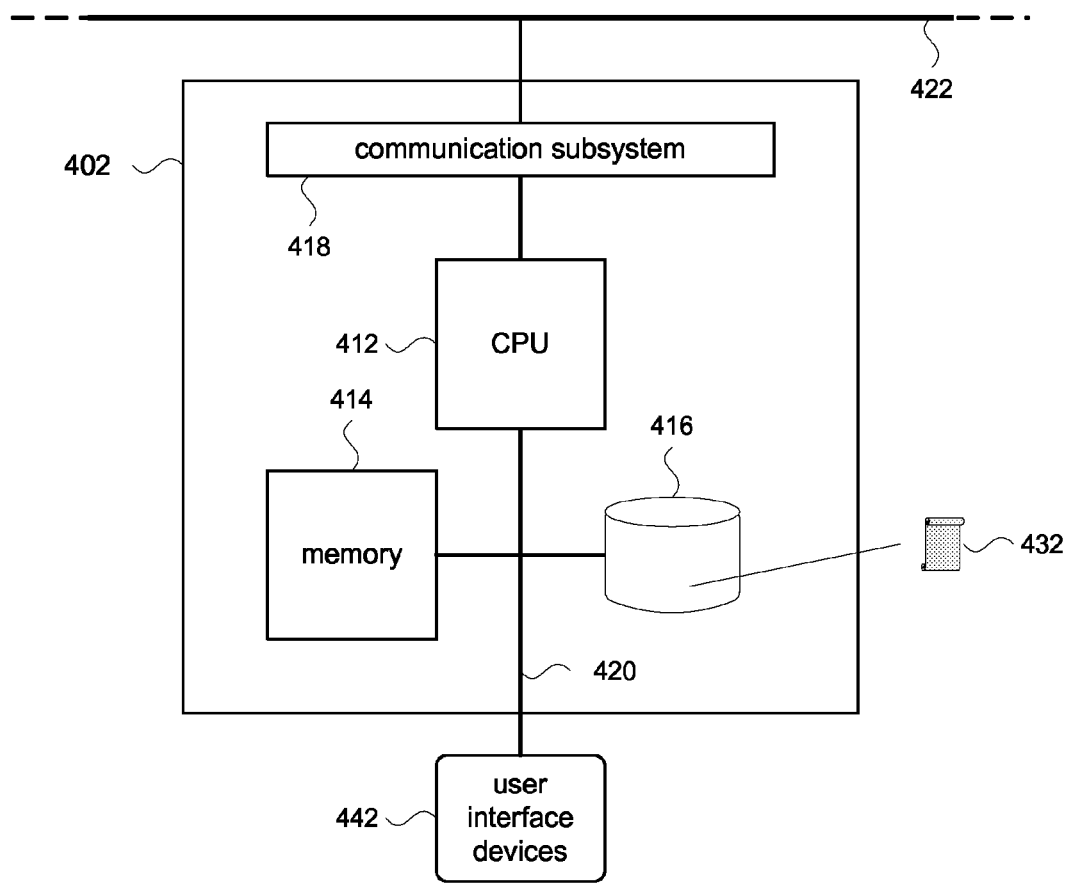
FIG. 4 shows an example of a particular embodiment of a system in accordance with the present disclosure.

A particular embodiment of a database system 106 in accordance with the present disclosure is illustrated in FIG. 4. The figure shows a high level block diagram of a computer system 402 configured as an in-memory database. The computer system 402 may include a central processing unit (CPU) or other suitable data processing subsystem (e.g., a multiprocessor system). The computer system 402 may include various data storage components. For example, the data storage components may include a memory subsystem 414 and a data storage subsystem 416. A communication subsystem 418 may be provided to allow the computer system 402 to communicate over a communication network 422, such as a local area network (LAN), the Internet, and so on. An internal system of bus lines 420 may interconnect the components comprising the computer system 402.

The data storage subsystem 416 may comprise a non-transitory computer readable medium having stored thereon computer executable program code 432. The computer executable program code 432 may be executed by the CPU 412 to cause the CPU to perform steps of the present disclosure. For example, the executable program code 432 may operate as the data model design tool 110. The data storage subsystem 416 may also serve as storage component of the database 106.

A user (e.g., 122) may interact with the computer system 402 using suitable user interface devices 442 to access the functionality of the data model design tool 110. User interface devices 442 may include, for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Advantages and Technical Effect

A new data model defined in accordance with the present disclosure will not affect the pre-existing data model from which it was defined. The new data model can be easily extended by the user for their own specific purposes. The incorporation of metadata from the pre-existing data model reduces the likelihood of introducing inconsistencies into the new data model and thus facilitates rapid and accurate development of the new data model.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method for creating a data model comprising operating a computer system to perform steps of:
    identifying at least one pre-existing data model; and
    interacting with a user to define a new data model using information comprising the pre-existing data model, including:
        presenting information to the user that is representative of data tables comprising the pre-existing data model;
        accessing a metadata repository comprising metadata associated with the pre-existing data model;
        presenting some of the metadata associated with the pre-existing data model to the user;
        receiving input from the user which specifies portions of the new data model that are based at least on a query performed on one or more of the data tables comprising the pre-existing data model; and
        using some of the metadata associated with the pre-existing data model to verify some of the input received from the user.

2. The method of claim 1 wherein input from the user includes a query on one or more of the data tables comprising the pre-existing data model.

3. The method of claim 1 wherein the metadata associated with the pre-existing data model comprises data that specifies relationships among data fields of one or more of the data tables which comprise the pre-existing data model.

4. The method of claim 1 wherein the metadata associated with the pre-existing data model comprises data that specifies characteristics of data stored in the data tables which comprise the pre-existing data model.

5. The method of claim 1 wherein presenting information to the user includes presenting one or more views of the data tables which comprise the pre-existing data model.

6. The method of claim 1 wherein presenting information to the user includes performing one or more database queries on one or more of the data tables which comprise the pre-existing data model.

7. The method of claim 1 further comprising operating the computer system to perform a step of identifying a second pre-existing data model, wherein defining a new data model includes using information comprising the second pre-existing data model.

8. A computer system comprising:
    a data processor; and
    a memory having stored thereon computer executable program code which, when executed, causes the data processor to:
        identify at least one pre-existing data model; and
        interact with a user to define a new data model using information comprising the pre-existing data model, wherein the data processor:
            presents information to the user that is representative of data tables comprising the pre-existing data model;
            accesses a metadata repository comprising metadata associated with the pre-existing data model;
            presents some of the metadata associated with the pre-existing data model to the user;
            receives input from the user which specifies portions of the new data model that are based at least on a query performed on one or more of the data tables comprising the pre-existing data model; and
            uses some of the metadata associated with the pre-existing data model to verify some of the input received from the user.

9. The computer system of claim 8 wherein input from the user includes a query on one or more of the data tables comprising the pre-existing data model.

10. The computer system of claim 8 wherein the metadata associated with the pre-existing data model comprises data that specifies relationships among data fields of one or more of the data tables which comprise the pre-existing data model.

11. The computer system of claim 8 wherein the metadata associated with the pre-existing data model comprises data that specifies characteristics of data stored in the data tables which comprise the pre-existing data model.

12. The computer system of claim 8 wherein information that is representative of data tables which comprise the pre-existing data model includes one or more views of the data tables.

13. The computer system of claim 12 wherein the views are specified by the user.

14. The computer system of claim 12 wherein the views are pre-existing views of the pre-existing data model.

15. The computer system of claim 8 wherein the data processor further identifies a second pre-existing data model, wherein the new data model includes information comprising the second pre-existing data model.

16. A non-transitory computer readable storage medium having stored thereon executable program code which, when executed by a data processor, causes the data processor to perform steps of:
    identifying at least one pre-existing data model; and
    interacting with a user to define a new data model using information comprising the pre-existing data model, including:
        presenting information to the user that is representative of data tables comprising the pre-existing data model;
        accessing a metadata repository comprising metadata associated with the pre-existing data model;
        presenting some of the metadata associated with the pre-existing data model to the user;
        receiving input from the user which specifies portions of the new data model that are based at least on a query performed on one or more of the data tables comprising the pre-existing data model; and using some of the metadata associated with the pre-existing data model to verify some of the input received from the user.

17. The non-transitory computer readable storage medium of claim 16 wherein the metadata associated with the pre-existing data model comprises data that specifies relationships among data fields of one or more of the data tables which comprise the pre-existing data model.

18. The non-transitory computer readable storage medium of claim 16 wherein the metadata associated with the pre-existing data model comprises data that specifies characteristics of data stored in the data tables which comprise the pre-existing data model.

19. The non-transitory computer readable storage medium of claim 16 wherein presenting information to the user includes presenting one or more views of the data tables which comprise the pre-existing data model.

20. The non-transitory computer readable storage medium of claim 16 wherein presenting information to the user includes performing one or more database queries on one or more of the data tables which comprise the pre-existing data model.

* * * * *